United States Patent
Jang et al.

(10) Patent No.: US 10,476,082 B2
(45) Date of Patent: Nov. 12, 2019

(54) SURFACE COATED POSITIVE ELECTRODE ACTIVE MATERIAL, PREPARATION METHOD THEREOF AND LITHIUM SECONDARY BATTERY INCLUDING THE SAME

(71) Applicants: LG Chem, Ltd., Seoul (KR); UNIST (Ulsan National Institute of Science and Technology), Ulsan (KR)

(72) Inventors: Wook Jang, Daejeon (KR); Sang Young Lee, Busan (KR); Seung Beom Cho, Daejeon (KR); Jun Seong Ahn, Daejeon (KR); Jang Hoon Park, Gyeonggi-do (KR); Ju Myung Kim, Gangwon-do (KR)

(73) Assignees: LG Chem, Ltd. (KR); UNIST (Ulsan National Institute of Science and Technology) (KR)

(*) Notice: Subject to any disclaimer, the term of this patent is extended or adjusted under 35 U.S.C. 154(b) by 56 days.

(21) Appl. No.: 15/039,266

(22) PCT Filed: Aug. 26, 2015

(86) PCT No.: PCT/KR2015/008915
§ 371 (c)(1),
(2) Date: May 25, 2016

(87) PCT Pub. No.: WO2016/032223
PCT Pub. Date: Mar. 3, 2016

(65) Prior Publication Data
US 2017/0170481 A1 Jun. 15, 2017

(30) Foreign Application Priority Data

Aug. 26, 2014 (KR) .................. 10-2014-0111504
Aug. 21, 2015 (KR) .................. 10-2015-0117752

(51) Int. Cl.
*H01M 4/583* (2010.01)
*H01M 4/60* (2006.01)
(Continued)

(52) U.S. Cl.
CPC ........... *H01M 4/628* (2013.01); *H01M 4/366* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS 8,586,237 B2    11/2013  Matsui
2003/0111253 A1  6/2003  Easter
(Continued)

FOREIGN PATENT DOCUMENTS

CN    101188283 A    5/2008
CN    101889059 A    11/2010
(Continued)

OTHER PUBLICATIONS

English translation of KR20110126418 (2011).*
(Continued)

*Primary Examiner* — Yoshitoshi Takeuchi
(74) *Attorney, Agent, or Firm* — Lerner, David, Littenberg, Krumholz & Mentlik, LLP (57) ABSTRACT

The present invention relates to a surface coated positive electrode active material, a preparation method thereof, and a lithium secondary battery including the same. More specifically, it relates to a positive electrode active material of which surface is coated with a nanofilm including polyimide (PI) and carbon black, a preparation method thereof, and a lithium secondary battery including the same. The positive (Continued)

(a)

(b)

electrode active material of which surface is coated with the nanofilm according to the present invention is capable of preventing direct contact of the positive electrode active material with an electrolyte thereby suppressing a side reaction between the positive electrode active material and the electrolyte, and as a result, a lifespan property of a lithium secondary battery using a positive electrode including the same may be significantly improved, and particularly, a lifespan property and conductivity are capable of being enhanced under a high temperature and high voltage condition.

17 Claims, 1 Drawing Sheet

(51) Int. Cl.
| | | |
|---|---|---|
| *H01M 4/133* | (2010.01) | |
| *H01M 10/0525* | (2010.01) | |
| *H01M 10/052* | (2010.01) | |
| *H01M 10/05* | (2010.01) | |
| *H01M 4/62* | (2006.01) | |
| *H01M 4/36* | (2006.01) | |
| *H01M 4/505* | (2010.01) | |
| *H01M 4/525* | (2010.01) | |
| *H01M 4/58* | (2010.01) | |
| *H01M 4/02* | (2006.01) | |

(52) U.S. Cl.
CPC ............... *H01M 4/58* (2013.01); *H01M 4/60* (2013.01); *H01M 4/62* (2013.01); *H01M 4/625* (2013.01); *H01M 10/052* (2013.01); *H01M 10/0525* (2013.01); *H01M 2004/028* (2013.01)

(56) References Cited

U.S. PATENT DOCUMENTS

| | | |
|---|---|---|
| 2005/0063892 A1 | 3/2005 | Tandon et al. |
| 2008/0118836 A1 | 5/2008 | Hwang et al. |
| 2010/0015523 A1 | 1/2010 | Ryu et al. |
| 2010/0247888 A1 | 9/2010 | Nishiura et al. |
| 2011/0065000 A1 | 3/2011 | Chang et al. |
| 2011/0111292 A1 | 5/2011 | Kwon et al. |
| 2011/0236816 A1* | 9/2011 | Stanyschofsky .......... C09C 1/44 430/108.9 |
| 2013/0292873 A1 | 11/2013 | Hong et al. |
| 2015/0017534 A1* | 1/2015 | Miyuki ................. H01M 4/622 429/217 |

FOREIGN PATENT DOCUMENTS

| | | | |
|---|---|---|---|
| CN | 102186932 A | 9/2011 | |
| CN | 103682247 A | 3/2014 | |
| CN | 104054200 A | 9/2014 | |
| EP | 2660273 A1 | 11/2013 | |
| JP | 2001126733 A | 5/2001 | |
| JP | WO 2013/115219 * | 8/2013 | ............. H01M 4/36 |
| JP | 2014041996 A | 3/2014 | |
| KR | 20100081947 A | 7/2010 | |
| KR | 20110126418 * | 11/2011 | ............ H01M 10/05 |
| KR | 20110126418 A | 11/2011 | |
| WO | 2013115219 A1 | 8/2013 | |

OTHER PUBLICATIONS

Park, Jang-Hoon, et al, "Polyimide gel polymer electrolyte-nanoencapsulated LiCoO2 cathode materials for high-voltage Li-ion batteries." Electrochemistry Communications, 2010, vol. 12, No. 8, pp. 1099-1102.

International Search Report from PCT/KR2015/008915, dated Dec. 9, 2015.

Extended European Search Report for Application No. EP15835187 dated May 17, 2017.

Chinese Search Report for Application No. CN201580030667.9 dated Aug. 28, 2018.

Park, Jang-Hoon, et al., "Polyimide/carbon black composite nanocoating layers as a facile surface modification strategy for high-voltage lithium ion cathode materials", Journal of Materials Chemistry A, Aug. 15, 2013, vol. 1, pp. 12441-12447.

* cited by examiner

SURFACE COATED POSITIVE ELECTRODE ACTIVE MATERIAL, PREPARATION METHOD THEREOF AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2015/008915 filed Aug. 26, 2015, published in Korean, which claims priority to Korean Patent Application No. 10-2015-0117752, filed on Aug. 21, 2015, and Korean Patent Application No. 10-2014-0111504, filed on Aug. 26, 2014, the disclosures of which are incorporated herein by reference.

TECHNICAL FIELD

This application claims priority to and the benefits of Korean Patent Application No. 10-2014-0111504, filed with the Korean Intellectual Property Office on Aug. 26, 2014, and Korean Patent Application No. 10-2015-0117752, filed with the Korean Intellectual Property Office on Aug. 21, 2015, the entire contents of which are incorporated herein by reference.

The present invention relates to a surface coated positive electrode active material, a preparation method thereof, and a lithium secondary battery including the same, and more particularly, to a positive electrode active material of which surface is coated with a nanofilm including polyimide (PI) and carbon black, a preparation method thereof, and a lithium secondary battery including the same.

BACKGROUND ART

Since their appearance in 1991 as a small, light and large capacity battery, lithium secondary batteries have been widely used as a power supply of mobile devices. Recently, with rapid development of electronics, communication and computer industries, camcorders, mobile phones, laptop PCs have appeared and made remarkable progresses, and demands for lithium secondary batteries as a power source driving these mobile electronic information communication devices have increased each day.

Lithium secondary batteries have a problem in that the lifespan rapidly decreases as charge and discharge are repeated.

Such a lifespan decrease is caused by a side reaction between a positive electrode and an electrolyte, and this phenomenon may become more serious under a high voltage and high temperature condition.

Accordingly, development of secondary batteries for a high voltage is required, and to this end, technologies controlling a side reaction between a positive electrode active material and an electrolyte or electrode interfacial reaction are very important.

In order to solve such a problem, a technology of coating a metal oxide including Mg, Al, Co, K, Na, Ca or the like on the surface of a positive electrode active material has been developed.

Particularly, it is generally known that oxides such as $Al_2O_3$, $ZrO_2$, and $AlPO_4$ are capable of being coated on the surface of a positive electrode active material. It is also established that the coating layer enhances stability of the positive electrode active material.

However, in the surface coating using the oxide coating layer, the oxide coating layer adopts a form of being finely dispersed in a nano-sized particle form instead of the oxide coating layer covering an overall surface of a positive electrode active material.

As a result, the surface modification effect of the positive electrode active material by the oxide coating layer is limited. In addition, the oxide coating layer is one type of an ion insulation layer in which lithium ion migration is difficult, and may cause an ion conductivity decrease.

In view of the above, the inventors of the present invention have studied a positive electrode active material capable of exhibiting an excellent lifespan property even under a high voltage condition while having excellent safety, and identified that a surface coated positive electrode active material prepared by forming a nanofilm including polyimide and carbon black having specific iodine number and oil absorption number on the surface of the positive electrode active material may effectively suppress a side reaction between the positive electrode active material and an electrolyte due to the nanofilm, and may exhibit an excellent lifespan property and conductivity even under a high voltage condition while having excellent safety, and completed the present invention.

DISCLOSURE

Technical Problem

The present invention has been made in view of the above, and an embodiment of the present invention is directed to providing a surface coated positive electrode active material having an excellent lifespan property not only under a general voltage condition but particularly under a high temperature and high voltage condition, and having excellent conductivity while having excellent safety, by coating the whole positive electrode active material surface with a nanofilm in which lithium ions are migratable and thereby effectively suppressing a side reaction between the positive electrode active material and an electrolyte.

Another embodiment of the present invention is directed to providing a method for preparing the surface coated positive electrode active material.

Still another embodiment of the present invention is directed to providing a positive electrode including the surface coated positive electrode active material.

Moreover, yet still another embodiment of the present invention provides a lithium secondary battery including the positive electrode, a negative electrode and a separator provided between the positive electrode and the negative electrode.

Technical Solution

An aspect of the present invention provides a surface coated positive electrode active material including a positive electrode active material; and a nanofilm including polyimide (PI) and carbon black coated on a surface of the positive electrode active material, wherein the nanofilm includes the polyimide and the carbon black in a weight ratio of 1:0.5 to 5.

In addition, another aspect of the present invention provides a method for preparing a surface coated positive electrode active material, the method including preparing a mixed solution mixing and dispersing carbon black into an organic solvent diluting polyamic acid; forming a film including the polyamic acid and the carbon black on a surface of a positive electrode active material by dispersing the positive electrode active material into the mixed solution; and imidization reacting the film-formed positive electrode active material, wherein the carbon black is used in an amount of 0.05% by weight to 5% by weight based on 100% by weight of the positive electrode active material.

Moreover, still another aspect of the present invention provides a positive electrode including the surface coated positive electrode active material.

Furthermore, yet still another aspect of the present invention provides a lithium secondary battery including the positive electrode, a negative electrode and a separator provided between the positive electrode and the negative electrode.

Advantageous Effects

A surface of a positive electrode active material according to the present invention is coated with a nanofilm including polyimide and carbon black, particularly, carbon black having an iodine number of 200 mg/g to 400 mg/g and an oil absorption number of 0.1 cc/g to 0.2 cc/g. Accordingly, direct contact of the positive electrode active material with an electrolyte can be prevented, and a side reaction between the positive electrode active material and the electrolyte can be suppressed.

As a result, a lithium secondary battery using a positive electrode including the positive electrode active material of which surface is coated with the nanofilm according to the present invention has a significantly improved lifespan property, and particularly, has an enhanced lifespan property and conductivity under a high temperature and high voltage condition.

BRIEF DESCRIPTION OF THE DRAWINGS

The accompanying drawings illustrate preferred embodiments of the present invention, and further enlighten technological ideas of the present invention as well as the contents of the invention described above, and therefore, the present invention should not be construed as limited to the embodiments set forth herein.

BEST MODE FOR THE INVENTION

Hereinafter, the present invention will be described in detail.

Terms or words used in the present specification and the claims are not to be interpreted limitedly as common or dictionary definitions, and shall be interpreted as meanings and concepts corresponding to technological ideas of the present invention based on a principle in which the inventors may suitably define the concepts of terms in order to describe the invention in the best possible way.

The present invention provides a surface coated positive electrode active material having excellent safety, and having an excellent lifespan property and conductivity under a high temperature and high voltage condition.

The surface coated positive electrode active material according to one embodiment of the present invention includes a positive electrode active material; and a nanofilm including polyimide (PI) and carbon black coated on a surface of the positive electrode active material, wherein the nanofilm includes the polyimide and the carbon black in a weight ratio of 1:0.5 to 5.

The nanofilm according to the present invention is a lithium ion migratable film instead of an ion insulation layer such as an inorganic oxide surface coating layer generally known in the art, and the nanofilm may include polyimide (PI) and carbon black as described above. By the nanofilm including polyimide (PI), lithium ions may readily migrate, and by including carbon black, electron conductivity may be enhanced.

In addition, the nanofilm may surround the whole surface of the positive electrode active material, and by the nanofilm surrounding the positive electrode active material surface, direct contact of the positive electrode active material with an electrolyte may be prevented, and accordingly, a side reaction between the positive electrode active material and the electrolyte may be suppressed. As a result, a lithium secondary battery using a positive electrode including a positive electrode active material of which surface is coated with the nanofilm may have increased safety and an enhanced lifespan property. Particularly, a lifespan property and conductivity may be superior not only under a general voltage condition, but under a high temperature and high voltage condition.

Specifically, polyimide included in the nanofilm may perform a role of a protective film preventing the positive electrode active material being in direct contact with an electrolyte.

The polyimide is a collective term for a polymer having an acid imide structure, and may be obtained from a synthesis using an aromatic anhydride and aromatic diamine. In the present invention, the polyimide may be obtained through an imidization reaction using polyamic acid as described later.

In addition, the carbon black included in the nanofilm have very excellent electric conductivity and lithium ion conductivity, and may perform a role of providing a path capable of reacting with lithium ions in an electrode, and as a result, are capable of greatly enhancing a lifespan property by uniformly maintaining current and voltage distribution in the electrode during charge-discharge cycles of a lithium secondary battery including a positive electrode active material of which surface is coated with the nanofilm.

The carbon black according to the present invention may be carbon black having an iodine number and an oil absorption number selected within a specific numerical range.

The term "iodine number" used in the present invention represents an amount of iodine absorbed to 100 g of a sample as g by converting, when interacting halogen with oils and fats or fatty acids using a reaction adding halogen to a double bond, the absorbed halogen amount to iodine, and is used as a figure presenting the number of unsaturated fatty acid double bonds in the sample, and as the number of the iodine number increases, more numbers of double bonds are present.

In the carbon black used in the present invention, the iodine number measured in accordance with the ASTM D-1510 may be from 200 mg/g to 400 mg/g, and when the iodine number of the carbon black is less than 200 mg/g, the carbon black is difficult to be sufficiently dispersed in a nanofilm, and when the iodine number is greater than 400 mg/g, a conductivity decrease problem may occur.

In other words, when the iodine number is in the above-mentioned range, the number of unsaturated bonds (double bonds) present in the carbon black may be appropriate, and specifically, binding force between carbon black particles, binding force with a solvent when being dispersed into the solvent, binding force with other mixtures and the like are appropriately controlled, and when dispersed into a solvent, the carbon black may be uniformly dispersed, or may be property aggregated so as to secure a conductive network.

The term "oil absorption number (OAN)" used in the present invention is a measured value for a property absorbing a liquid (oil), and may be used as a figure capable of presenting structural characteristics of a sample, particularly, a degree of dispersibility.

In the carbon black used in the present invention, the oil absorption number measured in accordance with the ASTM D-2414 may be from 100 cc/100 g to 200 cc/100 g.

When the oil absorption number is in the above-mentioned range, it may mean that a secondary structure formed by primary particles of the carbon black being partly aggregated with each other has a proper form, and such a secondary structure having a proper form may mean that the carbon black is capable of being smoothly dispersed in a solvent, and various routes are capable of being secured when securing a conductive network.

By the carbon black according to the present invention having an iodine number and an oil absorption number in the above-mentioned range, the carbon black may have more excellent dispersibility for a solvent than generally used carbon black, and a conductive network is significantly more readily secured due to an excellent secondary structural form.

The positive electrode active material according to the present invention has a nanofilm formed on the surface, and when carbon black is uniformly distributed together with polyimide on this nanofilm, having more excellent dispersibility and a proper secondary structure is required compared to a case in which carbon black is mixed to electrode slurry and used. Accordingly, with iodine number and oil absorption number values of carbon black used in electrode slurry preparation, it may be difficult to uniformly disperse the carbon black on a nanofilm.

However, as described above, carbon black having the above-mentioned iodine number and the oil absorption number values may be considerably uniformly distributed on a nanofilm due to excellent dispersibility, and a conductive network may be smoothly secured due to a uniform and excellent secondary structure.

In addition, the carbon black may be primary particles, secondary particles or a mixture of primary particles and secondary particles. When the carbon black is primary particles, the carbon black may have an average particle diameter of 10 nm to 100 nm, and when the carbon black is secondary particles, the carbon black may have an average particle diameter of less than 1000 nm. Furthermore, when the carbon black is secondary particles, the secondary particles may be crushed and used so as to have a similar average particle diameter with primary particles.

In addition, a surface of the carbon black may be preferably hydrophobized. Herein, the surface hydrophobization is not particularly limited and may be carried out using methods commonly known in the art, and for example, may be carried out by heat treating carbon black in a temperature range of 450° C. to 550° C. under air atmosphere or nitrogen atmosphere, immersing the result in an acid solution or alkali solution for pretreatment, and then dispersing the result into a perfluorinated compound.

The nanofilm according to the present invention may include the polyimide and the carbon black in a weight ratio of 1:0.5 to 5 as described above. When the weight ratio of the polyimide and the carbon black is less than 1:0.5, sufficient electric conductivity may be difficult to obtain, and when greater than 1:5, a problem of the carbon black being desorbed from the nanofilm may occur.

In addition, the carbon black may be included in 0.05% by weight to 5% by weight with respect to 100% by weight of the total surface coated positive electrode active material, and preferably in 0.2% by weight to 2% by weight.

The nanofilm may have a thickness of 1 nm to 200 nm, and preferably 5 nm to 50 nm. When the nanofilm has a thickness of less than 1 nm, an effect of a side reaction between the positive electrode active material and an electrolyte and an effect of an electric conductivity increase due to the nanofilm may be insignificant. In addition, when the nanofilm has a thickness of greater than 200 nm, the thickness of the nanofilm excessively increases becoming an obstacle in lithium ion mobility, and resistance may increase.

The positive electrode active material according to the present invention may be used in a general voltage or high voltage, and may be used without particular limit as long as it is a compound capable of reversibly inserting/desorbing lithium.

Specifically, the positive electrode active material according to one embodiment of the present invention may include a spinel lithium transitional metal oxide having a hexagonal close-packed layered rock salt structure, an olivine structure and a cubic structure with a high capacity property, and in addition to this, any one selected from the group consisting of $V_2O_5$, TiS, and MoS or a complex oxide of two or more types among these.

More specifically, the positive electrode active material may include any one selected from the group consisting of an oxide of the following Chemical Formula 1 to Chemical Formula 3, $V_2O_5$, TiS and MoS, or a mixture of two or more types among these:

$$Li_{1+x}[Ni_aCo_bMn_c]O_2 \quad \text{[Chemical Formula 1]}$$

($-0.5 \leq x \leq 0.6$, $0 \leq a, b, c \leq 1$, $x+a+b+c=1$);

$$LiMn_{2-x}M_xO_4 \quad \text{[Chemical Formula 2]}$$

(M is one or more elements selected from the group consisting of Ni, Co, Fe, P, S, Zr, Ti and Al, $0 \leq x \leq 2$);

$$Li_{1+a}Fe_{1-x}M_x(PO_{4-b})X_b \quad \text{[Chemical Formula 3]}$$

(M is one or more elements selected from the group consisting of Al, Mg, Ni, Co, Mn, Ti, Ga, Cu, V, Nb, Zr, Ce, In, Zn and Y, X is one or more elements selected from the group consisting of F, S and N, and $-0.5 \leq a \leq +0.5$, $0 \leq x \leq 0.5$, $0 \leq b \leq 0.1$).

More specifically, the positive electrode active material may include any one selected from the group consisting of $LiCoO_2$, $LiNiO_2$, $LiMnO_2$, $LiMn_2O_4$, $Li[Ni_aCo_bMn_c]O_2$ ($0<a, b, c \leq 1$, $a+b+c=1$) and $LiFePO_4$, or a mixture of two or more types among these.

In addition, the present invention provides a method for preparing the surface coated positive electrode active material.

A method for preparing the surface coated positive electrode active material according to one embodiment of the present invention includes preparing a mixed solution mixing and dispersing carbon black into an organic solvent diluting polyamic acid (step 1); forming a film including the polyamic acid and the carbon black on a surface of a positive electrode active material by dispersing the positive electrode active material into the mixed solution (step 2); and imidization reacting the film-formed positive electrode active material (step 3), wherein the carbon black is used in an amount of 0.05% by weight to 5% by weight based on 100% by weight of the positive electrode active material.

The step 1 is a step of preparing a mixed solution uniformly dispersing materials forming a nanofilm, and may be carried out by adding, mixing and dispersing carbon black into an organic solvent diluting polyamic acid.

In the step 1, a dispersant may be further included in the dispersion when mixing and dispersing the carbon black and the organic solvent diluting polyamic acid. The dispersant is not particularly limited as long as it is a compound capable of performing a role of helping the carbon black be uniformly dispersed overall in the organic solvent by being mixed to the carbon black and the organic solvent diluting polyamic acid, and examples thereof may include a block polymer such as a styrene-butadiene-styrene block polymer (SBS block polymer) or a styrene-butadiene-ethylene-styrene block polymer (SBES block polymer).

In the step 1, mixing and dispersing of the carbon black and the organic solvent diluting polyamic acid are normally carried out using a mixer operable at a rotation speed of 10,000 rpm or higher at room temperature (approximately 15° C. to 30° C.). The temperature range and the rotation speed range may be a condition under which a fiber-type carbon material may be smoothly dispersed into an organic solvent diluting polyamic acid, and when the temperature is excessively high, there is concern that the polyimidation reaction converting polyamic acid into polyimide may progress early.

Meanwhile, when each of the carbon black and the polyimide is separately coated on the positive electrode active material such that the carbon black are first coated or the polyimide is first coated, conductivity network may be secured by coating with the carbon black, and contact with an electrolyte may be prevented by coating with the polyimide, however, there is concern that the roles of the carbon black and the polyimide may conflict such that, when the carbon black are coated inside, conductivity network may not be favorably secured, and when the polyimide is coated inside, the conductive nanoparticles being in contact with an electrolyte may not be prevented.

However, according to the method for preparing a positive electrode active material according to one embodiment of the present invention, a nanofilm in which carbon black and polyimide are uniformly dispersed may be formed on a positive electrode active material by carrying out the step 1, and conductivity network may be readily secured therefrom, and a side reaction may be efficiently prevented by performing an excellent role in preventing contact with an electrolyte.

The polyamic acid according to the present invention is a precursor material for forming polyimide included in the nanofilm described above, and may include 4 component polyamic acid.

The 4 component polyamic acid is preferably polyamic acid including pyromellitic dianhydride, biphenyl dianhydride, phenylenediamine and oxydianiline.

In addition, the polyamic acid is not particularly limited, and may be prepared to be used using methods commonly known in the art, or commercially available materials may be purchased to be used. When the polyamic acid is prepared to be used, the polyamic acid may be obtained by reacting an aromatic anhydride and aromatic diamine in a polar aromatic solvent. Herein, the aromatic anhydride and the aromatic diamine may be reacted in the same equivalent.

Specifically, the aromatic anhydride is not particularly limited, and examples thereof may include any one selected from the group consisting of phthalic anhydride, pyromellitic dianhydride, 3,3'4,4'-biphenyltetracarboxylic dianhydride, 4' 4-oxydiphthalic anhydride, 3,3'4,4'-benzophenonetetracarboxylic dianhydride, trimellitic ethylene glycol, 4,4'-(4' 4-isopropylbiphenoxy)biphthalic anhydride and trimellitic anhydride, or a mixture of two or more types among these.

In addition, the aromatic diamine is not particularly limited, and examples thereof may include any one selected from the group consisting of 4,4'-oxydianiline, p-phenyl diamine, 2,2-bis(4-(4-aminophenoxy)-phenyl)propane, p-methylene dianiline, propyltetramethyldisiloxane, polyaromatic amine, 4,4'-diaminodiphenyl sulfone, 2,2'-bis(trifluoromethyl)-4,4'-diaminobiphenyl and 3,5-diamino-1,2,4-triazole, or a mixture of two or more types among these.

The polyamic acid may be used in 0.1% by weight to 1% by weight based on 100% by weight of the organic solvent.

The organic solvent is not particularly limited as long as it is a solvent capable of dissolving the polyamic acid, and examples thereof may include any one selected from the group consisting of cyclohexane, carbon tetrachloride, chloroform, methylene chloride, dimethylformamide, dimethylacetamide and N-methylpyrrolidone, or a mixture of two or more types among these.

In addition, as described above, the carbon black according to the present invention may be used in 0.05% by weight to 5% by weight with respect to 100% by weight of the positive electrode active material, and preferably in 0.2% by weight to 2% by weight.

The step 2 is a step of forming a film including the polyamic acid and the carbon black on a surface of a positive electrode active material by dispersing the positive electrode active material into the mixed solution prepared in the step 1 in order to form the film on the surface of the positive electrode active material, and may be carried out by adding and uniformly dispersing the positive electrode active material into the mixed solution, and then removing the solvent through heating and concentrating the result.

The dispersion of the positive electrode active material is not particularly limited, and for example, may be carried out by introducing the positive electrode active material to the mixed solution, and then stirring the result for 1 hour or longer using a high speed stirrer.

The step 3 is a step of imidization reacting the positive electrode active material including the film prepared in the step 2 in order to form a positive electrode active material in which a nanofilm is formed on the surface.

The imidization reaction may be carried out by heating the positive electrode active material including the film prepared in the step 2 up to approximately 300° C. to 400° C. with a rate of 3° C./minute at intervals of 50° C. to 100° C., and then maintaining the temperature for 10 minutes to 120 minutes in the range of 300° C. to 400° C. In addition, the temperature may be raised at intervals of 50° C. to 100° C., then maintained for, for example, 10 minutes to 120 minutes, and then raised again. More specifically, the imidization reaction may be progressed by heating the positive electrode active material including the film to 60° C., 120° C., 200° C. 300° C. and 400° C. each with a rate of 3° C./minute, and maintaining the temperature at 60° C. for 30 minutes, at 120° C. for 30 minutes, at 200° C. for 60 minutes, at 300° C. for 60 minutes and at 400° C. for 10 minutes.

Moreover, the present invention provides a positive electrode including the surface coated positive electrode active material.

The positive electrode may be prepared using methods commonly known in the art. For example, a positive electrode may be prepared by preparing positive electrode active material slurry through mixing a solvent, and as necessary, a binder, a conductor, a filler and a dispersant to the surface coated positive electrode active material and stirring the result, then applying (coating) the result on a positive electrode collector, and then compressing and drying the result.

The positive electrode collector may generally use those having a thickness of 3 μm to 500 μm, and any material that is metal to which the positive electrode active material slurry readily adhere, and having high conductivity without causing chemical changes in the corresponding battery may be used. Nonlimiting examples of the positive electrode collector may include copper, stainless steel, aluminum, nickel, titanium, baked carbon or aluminum, or stainless steel of which surface is treated with carbon, nickel, titanium, silver or the like, an aluminum-cadmium alloy, and the like. In addition, in order to bind to the positive electrode active material, those having a form in which a fine unevenness is formed on the surface, or having various forms such as films, sheets, foil, nets, porous materials, foams and non-woven fabrics may be used.

A solvent for forming the positive electrode includes an organic solvent such as N-methylpyrrolidone (NMP), dimethylformamide (DMF), acetone and dimethylacetamide, water, or the like, and these solvents may be used either alone or as a mixture of two or more types. As the amount of the solvent used, an amount capable of dissolving and dispersing the positive electrode active material, a binder and a conductor is sufficient considering the thickness of the applied slurry and the preparation yield.

The binder is a component assisting the binding of the positive electrode active material with a conductor and the binding for the positive electrode collector, and for example, various types of binder polymers such as a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene butadiene rubber (SBR), fluorine rubber, poly acrylic acid, and a polymer substituting hydrogen thereof with Li, Na, Ca or the like, or various copolymers.

The conductor is not particularly limited as long as it has conductivity without causing chemical changes in the corresponding battery, and examples thereof may include graphite such as natural graphite or artificial graphite; carbon black such as carbon black, acetylene black, Ketjen black, channel black, furnace black, lamp black or thermal black; conductive fibers such as carbon fibers or metal fibers; conductive tubes such as carbon nanotubes; metal powder such as fluorocarbon, aluminum or nickel powder; conductive whiskers such as zinc oxide and potassium titanate; conductive metal oxides such as titanium oxide; conductivity materials such as polyphenylene derivatives.

The filler is a component suppressing positive electrode expansion, and the use thereof may be decided as the need arises, and the filler is not particularly limited as a long as it is a fiber material and does not cause chemical changes in the corresponding battery. Examples thereof may include an olefin-based polymer such as polyethylene and polypropylene; and a fiber material such as glass fiber and carbon fiber.

As the dispersant, an aqueous dispersant or an organic dispersant such as N-methyl-2-pyrrolidone may be used.

The coating may be carried out using methods commonly known in the art, and for example, may be carried out by distributing the positive electrode active material slurry on the upper surface of the positive electrode collector, and then uniformly dispersing the slurry using a doctor blade and the like. In addition to this method, methods such as die casting, comma coating and screen printing may be used.

The drying is not particularly limited, but may be carried out for 1 day or less in a vacuum oven at 50° C. to 200° C.

Furthermore, the present invention provides a lithium secondary battery including the positive electrode, a negative electrode and a separator provided between the positive electrode and the negative electrode.

The lithium secondary battery according to one embodiment of the present invention includes the positive electrode including a positive electrode active material of which surface is coated with a nanofilm including polyimide and carbon black, a negative electrode, a separator provided between the positive electrode and the negative electrode, and an electrolyte.

In addition, the lithium secondary battery according to one embodiment of the present invention may exhibit an excellent lifespan property both in general voltage and high voltage regions, and particularly, may have a more excellent lifespan property in a high temperature and high voltage region. Specifically, the lithium secondary battery has a charging voltage of 4.2 V to 5.0 V.

The term "general voltage" used in the present specification may mean a region in which a charging voltage of a lithium secondary battery is in a range from 3.0 V and less than 4.2 V, the term "high voltage" may mean a region in which a charging voltage is in a range from 4.2 V to 5.0 V, and the term "high temperature" may mean a range from 45° C. to 65° C.

The negative electrode is not particularly limited, and may be prepared by applying negative electrode active material slurry on an upper surface on one side of a negative electrode collector, and then drying the result, and the negative electrode active material slurry may include additives such as a binder, a conductor, a filler and a dispersant as necessary in addition to a negative electrode active material.

As the negative electrode active material used in the negative electrode according to one embodiment of the present invention, a carbon material capable of absorbing and releasing lithium ions, lithium metal, silicon, tin or the like may be commonly used. A carbon material may be preferably used, and low crystalline carbon and high crystalline carbon may both be used. Low crystalline carbon typically includes soft carbon and hard carbon, and high crystalline carbon typically includes natural graphite, Kish graphite, pyrolytic carbon, mesophase pitch based carbon fiber, meso-carbon microbeads, mesophase pitches, and high-temperature baked carbon such as petroleum or coal tar pitch derived cokes.

The negative electrode collector may be the same as the positive electrode collector described above, or included therein, and additives such as a binder, a conductor, a filler and a dispersant included in the negative electrode may be the same as those used in preparing the positive electrode described above, or included therein.

In addition, the separator may be an insulating thin film having high ion transmittance and mechanical strength, and may generally have a pore diameter of 0.01 μm to 10 μm, and a thickness of 5 μm to 300 μm. As such a separator, a porous polymer film, for example, a porous polymer film prepared from a polyolefin-based polymer such as an ethylene homopolymer, a propylene homopolymer, an ethylene/butene copolymer, an ethylene/hexane copolymer and an ethylene/methacrylate copolymer may be used either alone or as a laminate thereof. Alternatively, common porous non-woven fabrics, for example, non-woven fabrics made of high melting point glass fiber or polyethylene terephthalate fiber may be used, however, the separator is not limited thereto.

The electrolyte used in the present invention may include a lithium salt commonly used in an electrolyte, and is not particularly limited.

An anion of the lithium salt may be one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte used in the present invention may include an organic-based liquid electrolyte, an inorganic-based liquid electrolyte, a solid polymer electrolyte, a gel-type polymer electrolyte, a solid inorganic electrolyte, a melting inorganic electrolyte and the like capable of being used in lithium secondary battery preparation, but is not limited thereto.

An appearance of the lithium secondary battery of the present invention is not particularly limited, and may include a cylinder type using a can, a square type, a pouch type, a coin type or the like.

The lithium secondary battery according to the present invention may be used in a battery cell used as a power supply of a small device, and may also be preferably used as a unit battery in a medium to large-sized battery module including a many number of battery cells.

Preferable examples of the medium to large-sized device include electric vehicles, hybrid electric vehicles, plug-in hybrid electric vehicles and power storage systems, however, the device is not limited thereto.

Hereinafter, the present invention will be specifically described with reference to examples. However, examples according to the present invention may be modified to various other forms, and the scope of the present invention is not interpreted to be limited to the examples described below. Examples of the present invention are provided in order to more completely describe the present invention for those having average knowledge in the art.

EXAMPLE

Hereinafter, the present invention will be further described with reference to examples and test examples, however, the present invention is not limited to these examples and test examples.

Preparation Example 1

A mixed solution of polyamic acid and carbon black was prepared by adding and uniformly dispersing 0.1 g of carbon black having an iodine number of 200 mg/g, an oil absorption number of 150 cc/100 g and an average particle diameter of 200 nm to 20 g of a solution in which polyamic acid is diluted in dimethylacetamide to have a concentration of 0.5% by weight.

To the prepared mixed solution, 20 g of $LiNi_{0.6}Mn_{0.2}Co_{0.2}O_2$ particles were introduced as a positive electrode active material, and then the result was stirred for 1 hour using a high speed stirrer. While continuing the stirring, the temperature was raised to the boiling point of the solvent to evaporate the solvent, and as a result, a positive electrode active material of which surface is coated with a film including polyamic acid and carbon black was prepared.

An imidization reaction was progressed by heating the prepared positive electrode active material of which surface is coated with a film including polyamic acid and carbon black to 60° C., 120° C., 200° C., 300° C. and 400° C. each with a rate of 3° C./minute, and maintaining the temperature at 60° C. for 30 minutes, at 120° C. for 30 minutes, at 200° C. for 60 minutes, at 300° C. for 60 minutes and at 400° C. for 10 minutes. As the imidization reaction completed, a $LiNi_{0.6}Mn_{0.2}Co_{0.2}O_2$ positive electrode active material of which surface is coated with a nanofilm including polyimide and carbon black was prepared. Herein, the polyimide and the carbon black in the prepared nanofilm had a weight ratio of 1:0.5.

Preparation Example 2

A $LiNi_{0.6}Mn_{0.2}Co_{0.2}O_2$ positive electrode active material of which surface is coated with a nanofilm including polyimide and carbon black was prepared in the same manner as in Preparation Example 1, except that carbon black having an iodine number of 400 mg/wpwg instead of 200 mg/g was used.

Preparation Example 3

A $LiNi_{0.6}Mn_{0.2}Co_{0.2}O_2$ positive electrode active material of which surface is coated with a nanofilm including polyimide and carbon black was prepared in the same manner as in Preparation Example 1, except that carbon black having an iodine number of 300 mg/g and an oil absorption number of 100 cc/100 g was used.

Preparation Example 4

A $LiNi_{0.6}Mn_{0.2}Co_{0.2}O_2$ positive electrode active material of which surface is coated with a nanofilm including polyimide and carbon black was prepared in the same manner as in Preparation Example 1, except that carbon black having an iodine number of 300 mg/g and an oil absorption number of 200 cc/100 g was used.

Preparation Example 5

A $LiNi_{0.6}Mn_{0.2}Co_{0.2}O_2$ positive electrode active material of which surface is coated with a nanofilm including polyimide and carbon black was prepared in the same manner as in Preparation Example 1, except that the amounts of the polyamic acid and the carbon black introduced were adjusted so that the polyimide and the carbon black in the finally prepared nanofilm had a weight ratio of 1:5.

Comparative Preparation Example 1

$LiNi_{0.6}Mn_{0.2}Co_{0.2}O_2$ of which surface is not coated was used.

Comparative Preparation Example 2

A $LiNi_{0.6}Mn_{0.2}Co_{0.2}O_2$ positive electrode active material of which surface is coated with polyimide was prepared in the same manner as in Preparation Example 1 except that the carbon black in Preparation Example 1 was not added.

Comparative Preparation Example 3

A $LiNi_{0.6}Mn_{0.2}Co_{0.2}O_2$ positive electrode active material of which surface is coated with a nanofilm including polyimide and carbon black was prepared in the same manner as in Preparation Example 1, except that carbon black having an iodine number of 150 mg/g and an oil absorption number of 150 cc/100 g was used.

Comparative Preparation Example 4

A $LiNi_{0.6}Mn_{0.2}Co_{0.2}O_2$ positive electrode active material of which surface is coated with a nanofilm including polyimide and carbon black was prepared in the same manner as in Preparation Example 1, except that carbon black having an iodine number of 450 mg/g and an oil absorption number of 150 cc/100 g was used.

Comparative Preparation Example 5

A $LiNi_{0.6}Mn_{0.2}Co_{0.2}O_2$ positive electrode active material of which surface is coated with a nanofilm including polyimide and carbon black was prepared in the same manner as in Preparation Example 1, except that carbon black having an iodine number of 300 mg/g and an oil absorption number of 50 cc/100 g was used.

Comparative Preparation Example 6

A $LiNi_{0.6}Mn_{0.2}Co_{0.2}O_2$ positive electrode active material of which surface is coated with a nanofilm including polyimide and carbon black was prepared in the same manner as in Preparation Example 1, except that carbon black having an iodine number of 300 mg/g and an oil absorption number of 250 cc/100 g was used.

Comparative Preparation Example 7

A $LiNi_{0.6}Mn_{0.2}Co_{0.2}O_2$ positive electrode active material of which surface is coated with a nanofilm including polyimide and carbon black was prepared in the same manner as in Preparation Example 1, except that the amounts of the polyamic acid and the carbon black introduced were adjusted so that the polyimide and the carbon black in the finally prepared nanofilm had a weight ratio of 1:0.1.

Comparative Preparation Example 8

A $LiNi_{0.6}Mn_{0.2}Co_{0.2}O_2$ positive electrode active material of which surface is coated with a nanofilm including polyimide and carbon black was prepared in the same manner as in Preparation Example 1, except that the amounts of the polyamic acid and the carbon black introduced were adjusted so that the polyimide and the carbon black in the finally prepared nanofilm had a weight ratio of 1:15.

Example 1

Preparation of Positive Electrode

The surface coated $LiNi_{0.6}Mn_{0.2}Co_{0.2}O_2$ positive electrode active material prepared in Preparation Example 1, carbon black as a conductor, and polyvinylidene fluoride (PVdF) as a binder were mixed in a weight ratio of 95:3:2, and the result was added to an N-methyl-2-pyrrolidone (NMP) solvent to prepare positive electrode active material slurry. The positive electrode active material slurry was applied on an aluminum (Al) thin film, a positive electrode collector, having a thickness of approximately 20 μm, and the result was dried for 2 hours at 130° C. and then roll pressed to prepare a positive electrode.

Preparation of Negative Electrode

Lithium metal foil was used as a negative electrode.

Preparation of Electrolyte

As an electrolyte, a 1M $LiPF_6$ non-aqueous electrolyte was prepared by adding $LiPF_6$ to a non-aqueous electrolyte solvent prepared through mixing ethylene carbonate (EC) and ethylmethyl carbonate (EMC) in a volume ratio of 1:2.

Preparation of Lithium Secondary Battery

After preparing a polymer-type battery through a common method using the prepared positive electrode, the negative electrode and a polyethylene separator (Tonen Chemical Corporation, F2OBHE, thickness=20 μm), and providing a mixed separator of an electrolyte and polypropylene therebetween, the prepared non-aqueous electrolyte was injected thereto to prepare a coin cell-type lithium secondary battery.

Example 2

A lithium secondary battery was prepared in the same manner as in Example 1 except that the positive electrode active material prepared in Preparation Example 2 was used instead of the positive electrode active material prepared in Preparation Example 1.

Example 3

A lithium secondary battery was prepared in the same manner as in Example 1 except that the positive electrode active material prepared in Preparation Example 3 was used instead of the positive electrode active material prepared in Preparation Example 1.

Example 4

A lithium secondary battery was prepared in the same manner as in Example 1 except that the positive electrode active material prepared in Preparation Example 4 was used instead of the positive electrode active material prepared in Preparation Example 1.

Example 5

A lithium secondary battery was prepared in the same manner as in Example 1 except that the positive electrode active material prepared in Preparation Example 5 was used instead of the positive electrode active material prepared in Preparation Example 1.

Comparative Example 1

A lithium secondary battery was prepared in the same manner as in Example 1 except that the positive electrode active material prepared in Comparative Preparation Example 1 was used instead of the positive electrode active material prepared in Preparation Example 1.

Comparative Example 2

A lithium secondary battery was prepared in the same manner as in Example 1 except that the positive electrode active material prepared in Comparative Preparation Example 2 was used instead of the positive electrode active material prepared in Preparation Example 1.

Comparative Example 3

A lithium secondary battery was prepared in the same manner as in Example 1 except that the positive electrode active material prepared in Comparative Preparation Example 3 was used instead of the positive electrode active material prepared in Preparation Example 1.

Comparative Example 4

A lithium secondary battery was prepared in the same manner as in Example 1 except that the positive electrode active material prepared in Comparative Preparation Example 4 was used instead of the positive electrode active material prepared in Preparation Example 1.

Comparative Example 5

A lithium secondary battery was prepared in the same manner as in Example 1 except that the positive electrode active material prepared in Comparative Preparation Example 5 was used instead of the positive electrode active material prepared in Preparation Example 1.

Comparative Example 6

A lithium secondary battery was prepared in the same manner as in Example 1 except that the positive electrode active material prepared in Comparative Preparation Example 6 was used instead of the positive electrode active material prepared in Preparation Example 1.

Comparative Example 7

A lithium secondary battery was prepared in the same manner as in Example 1 except that the positive electrode active material prepared in Comparative Preparation Example 7 was used instead of the positive electrode active material prepared in Preparation Example 1.

Comparative Example 8

A lithium secondary battery was prepared in the same manner as in Example 1 except that the positive electrode active material prepared in Comparative Preparation Example 8 was used instead of the positive electrode active material prepared in Preparation Example 1.

Test Example 1: SEM Photomicrograph

Morphology for the positive electrode active materials prepared in Preparation Example 1, and Comparative Preparation Examples 1 and 2 was analyzed using an electron microscope (FE-SEM). The results are shown in FIG. 1 to FIG. 4, respectively.

Figure 1:
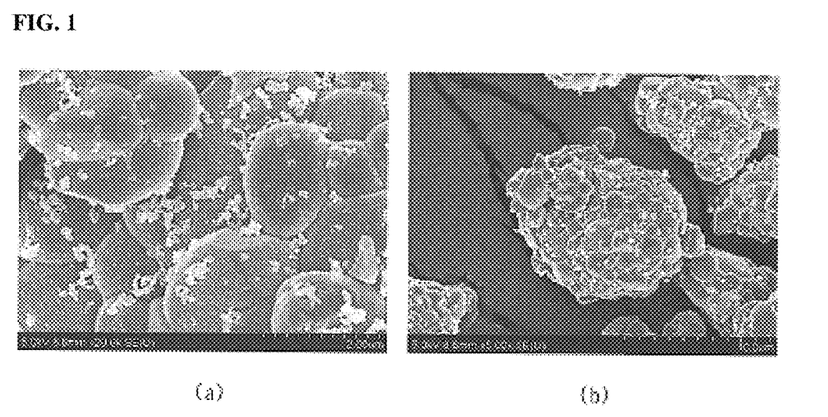
FIG. 1 is an electron micrograph (FE-SEM) result on a surface of a positive electrode active material of which surface is coated with a nanofilm including polyimide and carbon black prepared in Example 1 of the present invention.

When specifically examined, FIG. 1 is the result observing a surface of the $LiNi_{0.6}Mn_{0.2}Co_{0.2}O_2$ particles in which the surface is coated with the nanofilm including polyimide and carbon black prepared in Example 1 of the present invention, and it can be seen that a nanofilm having a few nanometer thickness, in which the polyimide and the carbon black were well dispersed, was formed on the coated $LiNi_{0.6}Mn_{0.2}Co_{0.2}O_2$ particle surface.

Figure 2:
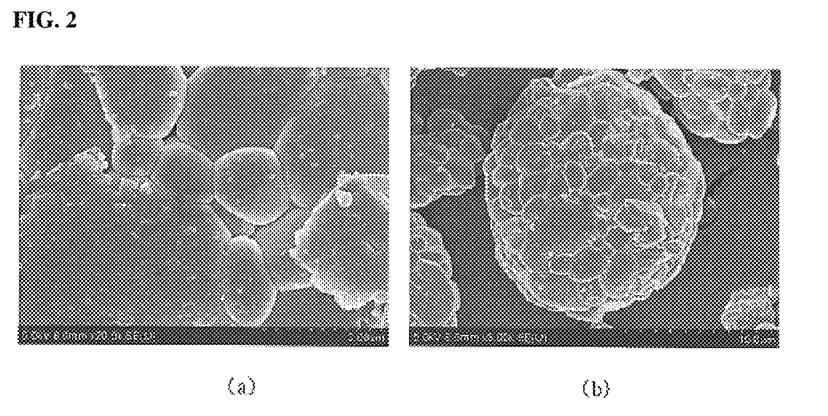
FIG. 2 is an electron micrograph (FE-SEM) result on a surface of a positive electrode active material of which surface is not coated prepared in Comparative Example 1.
Figure 3:
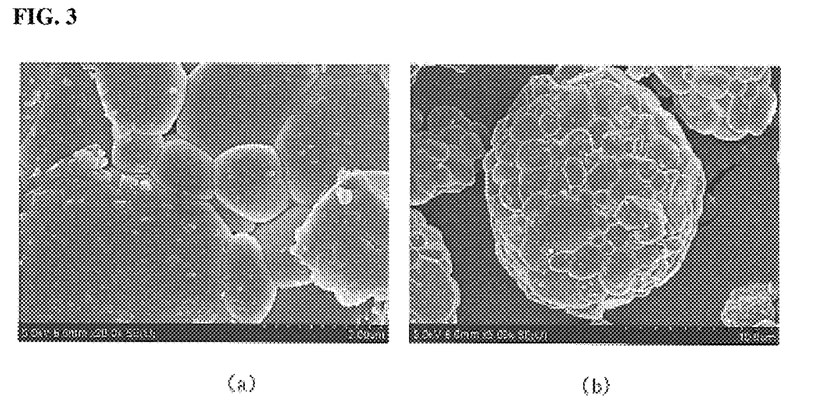
FIG. 3 is an electron micrograph (FE-SEM) result on a surface of a positive electrode active material of which surface is coated with polyimide prepared in Comparative Example 2.

FIG. 2 shows the $LiNi_{0.6}Mn_{0.2}CO_{0.2}O_2$ particles of Comparative Preparation Example 1, which are pure $LiNi_{0.6}Mn_{0.2}CO_{0.2}O_2$ particles of which surface is not coated, and FIG. 3 shows the $LiNi_{0.6}Mn_{0.2}Co_{0.2}O_2$ particles of which surface is coated with polyimide prepared in Comparative Preparation Example 2, and carbon black was not observed.

Test Example 2: Evaluation on Charging and Discharging Capacity and Efficiency Property In order to comparatively evaluate charging and discharging capacity and an efficiency property of each lithium secondary battery prepared in Examples 1 to 5 and Comparative Examples 1 to 8, each of the lithium secondary batteries (battery capacity 4.3 mAh) was charged and discharged (0.5 C charge/1 C discharge) in a voltage section of 3 V to 4.4 V at 45° C. A C-rate is a ratio of capacity when discharging the battery that was charged with 0.5 C with 0.1 C and capacity when discharging with 2 C as shown in the following Mathematical Equation:

$$\text{C-rate} = (\text{Capacity Value When Discharging With 2C})/(\text{Capacity Value When Discharging With 0.1 C}) \quad \text{[Mathematical Equation 1]}$$

TABLE 1

| Category | First Charging Capacity (mAh/g) | First Discharging Capacity (mAh/g) | First Efficiency (%) | C-rate (%) | 50th Capacity Retention Rate (%) |
|---|---|---|---|---|---|
| Example 1 | 219 | 198 | 90.4 | 91.3 | 97 |
| Example 2 | 220 | 199 | 90.5 | 91.8 | 97 |
| Example 3 | 220 | 199 | 90.5 | 91.5 | 97 |
| Example 4 | 219 | 198 | 90.4 | 91.4 | 97 |
| Example 5 | 220 | 199 | 90.5 | 91.8 | 97 |
| Comparative Example 1 | 218 | 200 | 91.6 | 91.2 | 85 |
| Comparative Example 2 | 218 | 196 | 90.0 | 88.5 | 95 |
| Comparative Example 3 | 219 | 195 | 89.0 | 88.5 | 85 |
| Comparative Example 4 | 218 | 194 | 89.0 | 88.7 | 88 |
| Comparative Example 5 | 220 | 195 | 88.6 | 90.0 | 90 |
| Comparative Example 6 | 219 | 194 | 88.6 | 90.0 | 90 |

TABLE 1-continued

| Category | First Charging Capacity (mAh/g) | First Discharging Capacity (mAh/g) | First Efficiency (%) | C-rate (%) | 50th Capacity Retention Rate (%) |
|---|---|---|---|---|---|
| Comparative Example 7 | 219 | 195 | 89.0 | 88.7 | 85 |
| Comparative Example 8 | 220 | 190 | 86.4 | 88.0 | 80 |

As can be seen from Table 1, it was identified that the lithium secondary batteries of Examples 1 to 5 had similar initial charging and discharging capacity but had significantly more excellent rate determining property (C-rate) and 50$^{th}$ capacity retention rate compared to the lithium secondary batteries of Comparative Example 1 to Comparative Example 8.

When specifically examined, it was identified that the lithium secondary batteries of Example 1 to Example 5 according to the present invention had a similar rate determining property but had a significantly more excellent 50$^{th}$ capacity retention rate compared to the lithium secondary battery of Comparative Example 1 including a positive electrode active material of which surface is not coated, and had a little higher 50$^{th}$ capacity retention rate but had a significantly more excellent rate determining property compared to the lithium secondary battery of Comparative Example 2 including a positive electrode active material of which surface is coated with polyimide only.

In addition, the lithium secondary batteries of Example 1 to Example 5 including a positive electrode active material according to the present invention exhibited more excellent rate determining property and 50$^{th}$ capacity retention rate compared to the lithium secondary batteries of Comparative Example 3 to Comparative Example 8 including a positive electrode active material of which surface is coated with polyimide and carbon black, however, the carbon black therein was not the carbon black according to the present invention or the mixing ratio was outside the range of the present invention.

Accordingly, it was identified that performances of the lithium secondary batteries of Examples 1 to 5 were generally improved compared to performances of the lithium secondary batteries of Comparative Examples 1 to 8.

The invention claimed is:

1. A lithium secondary battery comprising:
    a positive electrode; a negative electrode; and a separator provided between the positive electrode and the negative electrode;
    wherein the positive electrode includes a surface coated positive electrode active material comprising:
    a positive electrode active material; and
    a nanofilm, including polyimide (PI) and carbon black, coated on a surface of the positive electrode active material;
    wherein the nanofilm includes the polyimide and the carbon black in a weight ratio of 1:0.5 to 1:5;
    wherein an iodine number of the carbon black measured in accordance with the ASTM D-1510 is from 200 mg/g to 400 mg/g;
    wherein an oil absorption number of the carbon black measured in accordance with the ASTM D-2414 is from 100 cc/100 g to 200 cc/100 g;
    wherein the lithium secondary battery has a capacity retention rate of 97% or more after 50 cycles, in each of which the lithium secondary battery was charged at a charging rate of 0.5 C and discharged at a rate of 1 C, in a voltage range of 3 V to 4.4 V, at 45° C.

2. The lithium secondary battery of claim 1, wherein a surface of the carbon black is hydrophobized.

3. The lithium secondary battery of claim 1, wherein the carbon black has an average particle diameter of less than 1000 nm.

4. The lithium secondary battery of claim 1, wherein the nanofilm has a thickness range from 1 nm to 200 nm.

5. The lithium secondary battery of claim 1, wherein content of the carbon black is from 0.05% by weight to 5% by weight with respect to 100% by weight of the total surface coated positive electrode active material.

6. The lithium secondary battery of claim 1, wherein the positive electrode active material is any one selected from the group consisting an oxide of the following Chemical Formula 1 to Chemical Formula 3, $V_2O_5$, TiS and MoS, or a mixture of two or more types among these:

$$Li_{1+x}[Ni_aCo_bMn_c]O_2 \quad \text{[Chemical Formula 1]}$$

$(-0.5 \leq x \leq 0.6,\ 0 \leq a,b,c \leq 1, x+a+b+c=1)$;

$$LiMn_{2-x}M_xO_4 \quad \text{[Chemical Formula 2]}$$

(M is one or more elements selected from the group consisting of Ni, Co, Fe, P, S, Zr, Ti and Al, $0 \leq x \leq 2$);

$$Li_{1+a}Fe_{1-x}M_x(PO_{4-b})X_b \quad \text{[Chemical Formula 3]}$$

(M is one or more elements selected from the group consisting of Al, Mg, Ni, Co, Mn, Ti, Ga, Cu, V, Nb, Zr, Ce, In, Zn and Y, X is one or more elements selected from the group consisting of F, S and N, $-0.5 \leq a \leq +0.5$, $0 \leq x \leq 0.5, 0 \leq b \leq 0.1$).

7. The lithium secondary battery of claim 6, wherein positive electrode active material is any one selected from the group consisting of $LiCoO_2$, $LiNiO_2$, $LiMnO_2$, $LiMn_2O_4$, $Li[Ni_aCo_bMn_c]O_2(0<a,b,c \leq 1,\ a+b+c=1)$ and $LiFePO_4$, or a mixture of two or more types among these.

8. A method for preparing the lithium secondary battery of claim 1 comprising:
    a method of preparing the surface coated positive electrode active material comprising:
    mixing and dispersing carbon black into a solution of polyamic acid diluted in an organic solvent to form a mixed solution;
    forming a film including the polyamic acid and the carbon black on a surface of a positive electrode active material by dispersing the positive electrode active material into the mixed solution; and
    imidization reacting the film-formed positive electrode active material,
    wherein the carbon black is used in an amount of 0.05% by weight to 5% by weight based on 100% by weight of the positive electrode active material.

9. The method for preparing the lithium secondary battery of claim 8, wherein the imidization reaction is carried out while raising a temperature of the positive electrode active material from a starting temperature up to a temperature within a range of from 300° C. to 400° C. by:

(1) raising the temperature of the positive electrode active material at a rate of 3°C./minute until the temperature of the positive electrode active material has increased by 50° C. to 100° C.;

(2) subsequently maintaining the temperature of the positive electrode active material for a period of 10 minutes to 120 minutes;

(3) repeating steps (1) and (2) until the temperature of the positive electrode active material reaches the temperature within the range of from 300° C. to 400° C.

10. The method for preparing the lithium secondary battery of claim 9, wherein the imidization reaction further includes maintaining the temperature for 10 minutes to 120 minutes after the temperature is raised to the temperature within the range of 300° C. to 400° C.

11. The method for preparing the lithium secondary battery of claim 8, wherein the polyamic acid is used in an amount from 0.1% by weight to 1% by weight based on 100% by weight of the organic solvent.

12. The method for preparing the lithium secondary battery of claim 8, wherein the polyamic acid is prepared by reacting an aromatic anhydride and a diamine.

13. The method for preparing the lithium secondary battery of claim 12, wherein the aromatic anhydride is any one selected from the group consisting of phthalic anhydride, pyromellitic dianhydride, 3,3'4,4'-biphenyltetracarboxylic dianhydride, 4'4-oxydiphthalic anhydride, 3,3'4,4'-benzophenonetetracarboxylic dianhydride, trimellitic ethylene glycol, 4,4'-(4'4-isopropylbiphenoxy)biphthalic anhydride and trimellitic anhydride, or a mixture of two or more types among these.

14. The method for preparing the lithium secondary battery of claim 12, wherein the diamine is any one selected from the group consisting of 4,4'-oxydianiline, p-phenyl diamine, 2,2-bis(4-(4-aminophenoxy)-phenyl)propane, p-methylene dianiline, propyltetramethyldisiloxane, polyaromatic amine, 4,4'-diaminodiphenyl sulfone, 2,2'-bis(trifluoromethyl)-4,4'-diaminobiphenyl and 3,5-diamino-1,2,4-triazole, or a mixture of two or more types among these.

15. The method for preparing the lithium secondary battery of claim 8, wherein the polyamic acid includes 4 component polyamic acid.

16. The method for preparing the lithium secondary battery of claim 15, wherein the 4 component polyamic acid is polyamic acid including pyromellitic dianhydride, biphenyl dianhydride, phenylenediamine and oxydianiline.

17. The method for preparing the lithium secondary battery of claim 8, wherein the organic solvent is selected from the group consisting of cyclohexane, carbon tetrachloride, chloroform, methylene chloride, dimethylformamide, dimethylacetamide and N-methylpyrrolidone, or a mixture of two or more types among these.

* * * * *